United States Patent
Dewan et al.

(10) Patent No.: US 11,734,241 B2
(45) Date of Patent: Aug. 22, 2023

(54) EFFICIENT SPATIAL INDEXING

(71) Applicant: International Business Machines Corporation, Armonk, NY (US)

(72) Inventors: Pranita Sharad Dewan, White Plains, NY (US); Joao Souto Maior, Jaboatao dos Guararapes (BR)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 17/104,005

(22) Filed: Nov. 25, 2020

(65) Prior Publication Data

US 2022/0164331 A1    May 26, 2022

(51) Int. Cl.
  *G06F 16/2455*    (2019.01)
  *G06F 16/22*    (2019.01)

(52) U.S. Cl.
  CPC .... *G06F 16/2228* (2019.01); *G06F 16/24553* (2019.01)

(58) Field of Classification Search
  CPC ............... G06F 16/2228; G06F 16/24553
  See application file for complete search history.

(56) References Cited

U.S. PATENT DOCUMENTS

| | | | |
|---|---|---|---|
| 6,728,708 B1 | 4/2004 | Yotka | |
| 7,003,443 B2 | 2/2006 | Ford | |
| 7,707,140 B2 | 4/2010 | Leishman | |
| 8,738,444 B2 | 5/2014 | Knorr | |
| 8,918,730 B2 | 12/2014 | Von Kaenel | |
| 2006/0236074 A1* | 10/2006 | Williamson | G06F 12/1054 711/216 |
| 2007/0043757 A1* | 2/2007 | Benton | G06F 16/137 |

(Continued)

FOREIGN PATENT DOCUMENTS

| | | |
|---|---|---|
| CN | 107392447 A | 11/2017 |
| WO | 2022111877 A1 | 6/2022 |

OTHER PUBLICATIONS

Stackoverflow, "Why is my Sql Query is Faster the Second Time it Runs?", Oct. 29, 2018 https://stackoverflow.com/questions/53040095/why-is-my-sql-query-is-faster-the-second-time-it-runs (Year: 2018).*

*Primary Examiner* — Allen S Lin
(74) *Attorney, Agent, or Firm* — Gilbert Harmon, Jr.; Christopher M. Pignato (57) ABSTRACT

Embodiments herein describe computer-implemented methods, computer program products and systems for efficient spatial indexing. In an embodiment, the computer-implemented method may include one or more processors configured for obtaining from a database index data representing one or more assets, wherein each of the one or more assets comprise an asset identifier and a spatial attribute; generating a location hash for each of the one or more assets using the respective asset identifier and the respective spatial attribute; determining one or more sets of location hashes based on the asset identifier and the spatial attribute at one of one or more precision values; generating shadow index data comprising the one or more sets of location hashes at the one of one or more precision values; receiving a query corresponding to the index data; and returning a first set of results corresponding to the query in a first query response time.

15 Claims, 6 Drawing Sheets

(56) References Cited

U.S. PATENT DOCUMENTS

| | | | |
|---|---|---|---|
| 2010/0082630 A1* | 4/2010 | Zagelow | G06F 16/2272 |
| | | | 707/741 |
| 2013/0097163 A1 | 4/2013 | Juhani | |
| 2013/0971631 | 4/2013 | Oikarinen | |
| 2013/0218890 A1 | 8/2013 | Fernandes | |
| 2014/0278228 A1* | 9/2014 | Agrawal | G01C 21/32 |
| | | | 702/157 |
| 2014/0280318 A1 | 9/2014 | Simms | |
| 2014/2803181 | 9/2014 | Simms | |
| 2019/0146946 A1* | 5/2019 | Zhang | G06F 16/1744 |
| | | | 707/667 |
| 2020/0082329 A1 | 3/2020 | Megannon | |
| 2020/0334317 A1* | 10/2020 | Ashman | G06F 16/953 |
| 2020/0348662 A1* | 11/2020 | Cella | G05B 23/024 |
| 2021/0158174 A1* | 5/2021 | DeLuca | G06F 16/2379 |

* cited by examiner

EFFICIENT SPATIAL INDEXING

RESEARCH OR DEVELOPMENT

This invention was made with U.S. Government support under contract number W911NF-16-3-0001 awarded by the Army Research Office (ARO). The U.S. Government has certain rights to this invention.

BACKGROUND OF THE INVENTION

The present invention relates generally to the field of database management, and more particularly to enabling efficient spatial indexing for enterprise asset management data.

Enterprise asset management (EAM) is the management of the maintenance of physical assets of an organization throughout the lifecycle of assets. EAM may also include setup, maintenance, or decommissioning of assets. Existing EAM systems provide support to work with spatial relationships among various assets, locations, and work data. Example EAM spatial systems currently leverage third-party application programming interface (API) systems for working with assets and other data that have associated spatial relationships.

EAM systems are used to manage various data types and facilitate collaboration with third-party APIs. Some third-party API's provide data corresponding to assets with spatial attributes that consume more data storage resources than one dimensional data. However, as data assets increase in volume, more computational and database resources are required to facilitate efficient data processing for those large volumes of spatial data types. Indexing techniques are used to employ efficient spatial data processing. As a prerequisite, the spatial data must be in a compatible format before it can be processed by a third-party API.

SUMMARY

Embodiments of the present invention describe computer-implemented methods, computer program products and systems for efficient spatial indexing. In an embodiment, the computer-implemented method may include one or more processors configured for obtaining, from a database, index data representing one or more assets, wherein each of the one or more assets comprise an asset identifier and a spatial attribute; generating a location hash for each of the one or more assets using the respective asset identifier and the respective spatial attribute; determining one or more sets of location hashes based on the asset identifier and the spatial attribute at one of one or more precision values; generating shadow index data comprising the one or more sets of location hashes at the one of one or more precision values; receiving a query corresponding to the index data; and returning a first set of results corresponding to the query in a first query response time.

In an embodiment, the location hash may be a geohash including a point value, a radius value, and one of the one or more precision values. In an embodiment, each spatial attribute may include a longitudinal value and a latitudinal value corresponding to a geographical location.

In an embodiment, responsive to receiving the query, the one or more processors may be configured for converting the query to a multi-step query by: scanning a first set of containments of the shadow index data based on a range of the location hash associated with the one or more assets; and performing a spatial operation on the first set of containments.

In an embodiment, the one or more processors may be configured for returning a second set of results corresponding to the query in a second query response, wherein the first set of results may be based on the shadow index data and the second set of results may be based on the index data, and wherein the first query response time may be less than the second query response time by a predetermined threshold.

In an embodiment, the one or more processors configured for generating the shadow index data may be further configured for creating a copy of the index data; and storing the copy of the index data in a shadow index table, wherein each of the sets of location hashes may be stored at their respective precision values.

In an embodiment, the one or more processors may be configured for inserting the asset identifier and the spatial attribute for each asset into the respective sets of location hashes in the copy of the index data in the shadow index table.

DETAILED DESCRIPTION

Enterprise asset management (EAM) is the management of the maintenance of physical assets of an organization throughout the lifecycle of assets. However, communication between EAM systems and third-party APIs do not provide ways to natively index spatial data to improve querying performance. Major performance bottlenecks are challenges faced when dealing with millions of records, which is a typical quantity of records for larger clients and use cases. When EAM systems and third-party APIs do not provide compatible data solutions to enable efficient spatial indexing, clients face tremendous difficulties. Embodiments of the present invention recognize that a solution is needed to natively store and index spatial data in an EAM system to maximize query efficiency and scalability by manipulating index tables and data while reducing latency issues and API changes incurred when incorporating third-party solutions.

Embodiments of the present invention provide an EAM system that may be configured to assist an organization in managing its assets such as buildings, vehicles, fire extinguishers, recording equipment, equipment for recording maintenance schedules, and participating in workflows to manage the assets. The EAM system may be a stand-alone solution running on a personal computing device or a server-based solution, wherein the EAM system may include options to be deployed in a multitenancy solution which has options for deployment in the cloud and delivery by a Software as a Service (SaaS) solution. Some versions of the EAM system may be implemented to leverage newer technologies and be configured for automated interfacing feeds, integration with enterprise level database, and resource and reporting tools.

Embodiments of the present invention provide EAM systems that may be configured to communicate with third-party APIs to provide solutions for clients managing assets having spatial data attributes. For example, EAM systems may include management functionality to visualize the spatial relationships among assets and other mapped features. EAM systems may extend capabilities of third-party APIs by adding maps for assets, locations, work order tracking, and service requests. The maps include spatial attributes for each asset to be viewed for various management purposes. Each asset may be stored in a database in an index table for later access or for processing functions. Indexing data enables more efficient searching operations to be performed on the multitudes of assets stored in the database index table.

An index is a copy of data columns selected from a table that can be searched more efficiently as opposed to in its original data store location. An index may include a low-level address to direct link to a complete row of data that it was copied from. In effect, the index is significantly smaller than the actual table in question. Indexes are used to quickly locate data without having to search every row in a database table every time a database table is accessed. Indexes can be created using one or more columns of a database table, providing the bases for both rapid random lookups and efficient access of ordered data records.

Implementation of embodiments of the invention may take a variety of forms, and exemplary implementation details are discussed subsequently with reference to the Figures.

Embodiments of the present invention describe computer-implemented methods, computer program products, and systems for efficient spatial indexing. In an embodiment, the computer-implemented method may include one or more processors configured for obtaining, from a database, index data representing one or more assets, wherein each of the one or more assets comprise an asset identifier and a spatial attribute. The index data may be representative of a library of assets stored in a database and organized in an index table based on certain attributes. Each asset may include an asset identifier to identify one particular asset and distinguish it from another asset. Each asset may also include a spatial attribute corresponding to its relative position within a geographical location.

The computer-implemented method may include one or more processors configured for generating a location hash for each of the one or more assets using the respective asset identifier and the respective spatial attribute. For example, generating a location hash may include transforming a string of characters into a usually shorter fixed-length value or key that represents the original string. A location hash may be used to anchor a part of an asset address in a database. A location hash may be used to index and retrieve assets in a database because it is faster to find the assets using the shorter hashed key than to find it using the original value. Thus, in this embodiment, a location hash may be generated for each asset using at least the asset identifier and the spatial attribute. The asset identifier may be some combination of numeric, alphabetic, or alphanumeric characters. The location hash may be a geohash including a point value, a radius value, and one of the one or more precision values. In an embodiment, the spatial attribute may include a longitudinal value and a latitudinal value corresponding to a geographical location.

The computer-implemented method may include one or more processors configured for determining one or more sets of location hashes based on the asset identifier and the spatial attribute at one of one or more precision values. For example, a precision value may correspond to a fraction of retrieved items that are relevant to the query (e.g., true positives divided by the true+false positives), using a pre-selected set of ground truths. In other words, precision is the fraction of retrieved assets that are relevant to the queried dataset as shown in equation (1).

$$\text{precision} = \frac{|\{\text{relevant assets}\} \cap \{\text{retrieved assets}\}|}{|\{\text{retrieved assets}\}|} \qquad (1)$$

Therefore, a first set of location hashes may be determined based on assets defined by the asset identifiers and the spatial attributes at a first precision value. Further, a second set of location hashes may be determined based on assets defined by the asset identifiers and the spatial attributes at a second precision value that is different from the first precision value.

The computer-implemented method may include one or more processors configured for generating shadow index data comprising the one or more sets of location hashes at the one of one or more precision values. In an embodiment, the one or more processors configured for generating the shadow index data may be further configured for creating a copy of the index data; and storing the copy of the index data in a shadow index table, wherein each of the sets of location hashes may be stored at their respective precision values.

The computer-implemented method may include one or more processors configured for receiving a query corresponding to the index data. In an embodiment, responsive to receiving the query, the one or more processors may be configured for converting the query to a multi-step query by: scanning a first set of containments of the shadow index data based on a range of the location hash associated with the one or more assets; and performing a spatial operation on the first set of containments.

The computer-implemented method may include one or more processors configured for returning a first set of results corresponding to the query in a first query response time.

In an embodiment, the one or more processors may be configured for returning a second set of results corresponding to the query in a second query response, wherein the first set of results may be based on the shadow index data and the second set of results may be based on the index data, and wherein the first query response time may be less than the second query response time by a predetermined threshold.

In an embodiment, the one or more processors may be configured for inserting the asset identifier and the spatial attribute for each asset into the respective sets of location hashes in the copy of the index data in the shadow index table.

Figure 1:
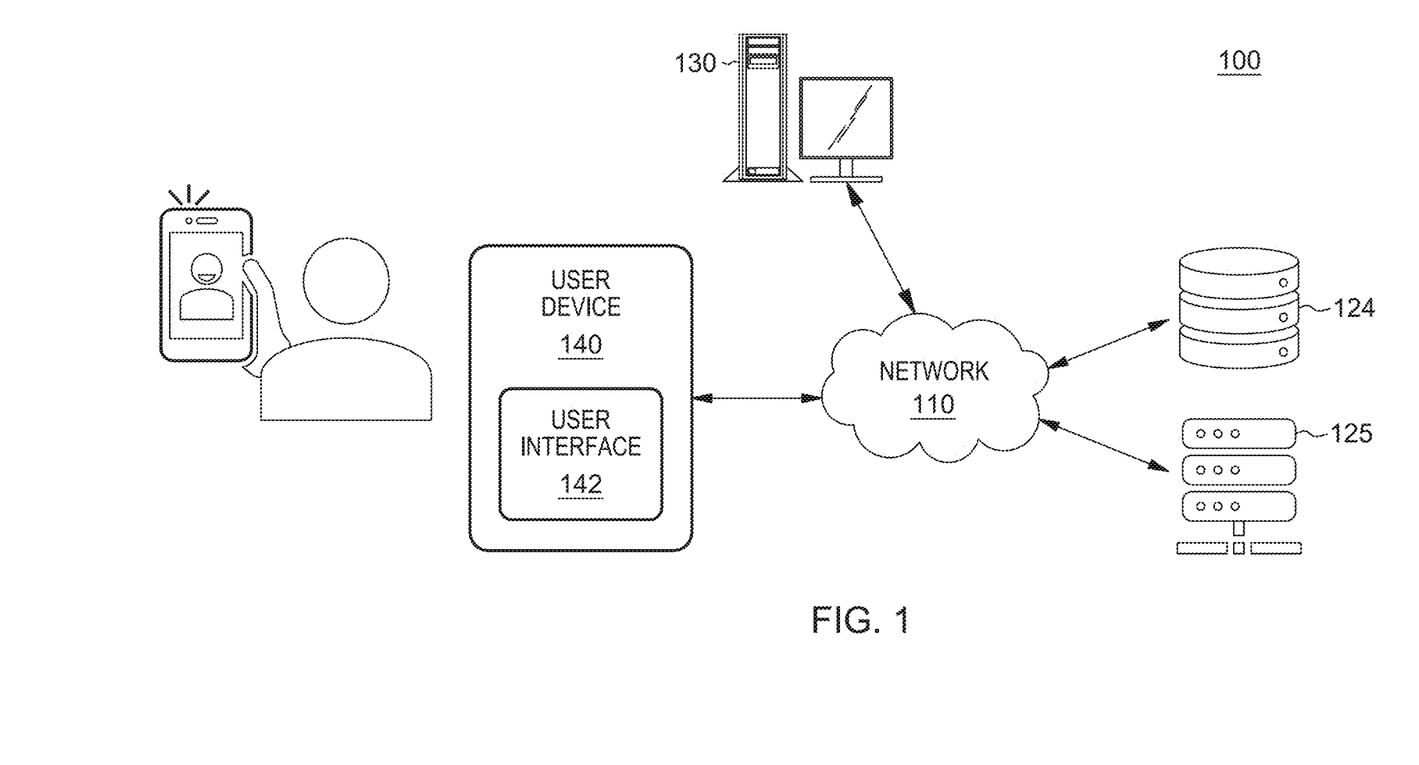
FIG. 1 is a functional block diagram illustrating a distributed data processing environment, in accordance with an embodiment of the present invention.

FIG. 1 is a functional block diagram illustrating a distributed data processing environment, generally designated 100, in accordance with an embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes computing device 130, user device 140, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 130, user device 140, server 125, and database 124. Distributed data processing environment 100 may also include additional servers, computers, or other devices not shown.

Computing device 130 and user device 140 operate to execute at least a part of a computer program for efficient spatial indexing. In an embodiment, computing device 130, and/or user device 140 may be configured to send and/or receive data from one or more of the other computing device(s) via network 110. User device 140 may include user interface 142 configured to facilitate interaction between a user and user device 140. For example, user interface 142 may include a display as a mechanism to display data to a user and may be, for example, a touch screen, light emitting diode (LED) screen, or a liquid crystal display (LCD) screen. User interface 142 may also include a keypad or text entry device configured to receive alphanumeric entries from a user. User interface 142 may also include other peripheral components to further facilitate user interaction or data entry by user associated with user device 140.

In some embodiments, computing device 130 and/or user device 140 may be a management server, a web server, or any other electronic device or computing system capable of receiving and sending data. In some embodiments, computing device 130, and/or user device 140 may be a laptop computer, tablet computer, netbook computer, personal computer (PC), a desktop computer, a smart phone, or any programmable electronic device capable of communicating with database 124, server 125 via network 110. Computing device 130 and/or user device 140 may include components as described in further detail in FIG. 6.

Computing device 130 may be configured to receive, store, and/or process data received via communication with other computing device(s) connected to network 110. For example, computing device 130 may be communicatively coupled to database 124 and/or server 125 and receive, via a communications link, data corresponding to EAM systems and associated third-party APIs. Computing device 130 may be configured to store the data in memory or transmit the data to database 124 and/or server 125 via network 110 for further storage and/or processing.

Database 124 operates as a repository for data flowing to and from network 110. Examples of data include asset data, spatial attribute data, and other data that may be determined based on the asset data and the spatial attribute data. A database is an organized collection of data. Database 124 can be implemented with any type of storage device capable of storing data and configuration files that can be accessed and utilized by computing device 130 and/or user device 140, such as a database server, a hard disk drive, or a flash memory. In an embodiment, database 124 is accessed by computing device 130 and/or user device 140 to store data corresponding to efficient spatial indexing. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with computing device 130, user device 140, and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 6.

Figure 2:
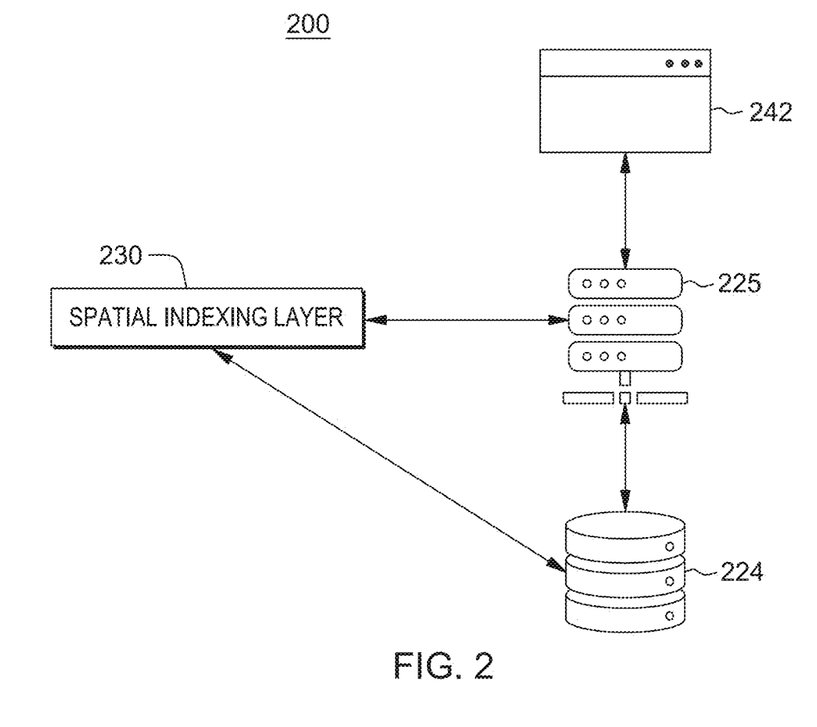
FIG. 2 is a functional block diagram illustrating a distributed data processing environment for efficient spatial indexing, in accordance with an embodiment of the present invention.

FIG. 2 is a functional block diagram illustrating a distributed data processing environment 200 for efficient spatial indexing, in accordance with an embodiment of the present invention.

In an embodiment, environment 200 includes a user device (not shown) with associated user interface 242 in communication with server 225, wherein user interface 242 may be configured to facilitate interactions between a user of the user device and connected operations to be executed on server 225. Further, environment 200 includes database 224 in communication with server 225 and spatial indexing layer 230. One or more processors may be configured to create shadow tables in database 224, wherein the shadow tables may include geohashes created using asset identifiers and spatial attributes, wherein the geohashes consume less database resources than the asset identifiers and spatial attributes. In an embodiment, one or more processors may be configured to store one-dimensional geohashes in shadow tables created in database 224. The one-dimensional geohashes may be created for each spatial object (e.g., spatial asset) comprising an asset identifier and a spatial attribute. In an embodiment, environment 200 may also include one or more processors executing at the spatial indexing layer 230 configured to receive a query comprising a spatial attribute (e.g., geometry G) and a spatial operation S, and return or obtain a geohash range R, wherein the geohash range may be used to perform ranged-based scans on a shadow index table to generate a first result. Further, the one or more processors executing at the spatial indexing layer 230 may be configured to perform a spatial operation S on the first result to get a second result, wherein the second result may be achieved in a more efficient manner.

Figure 3:
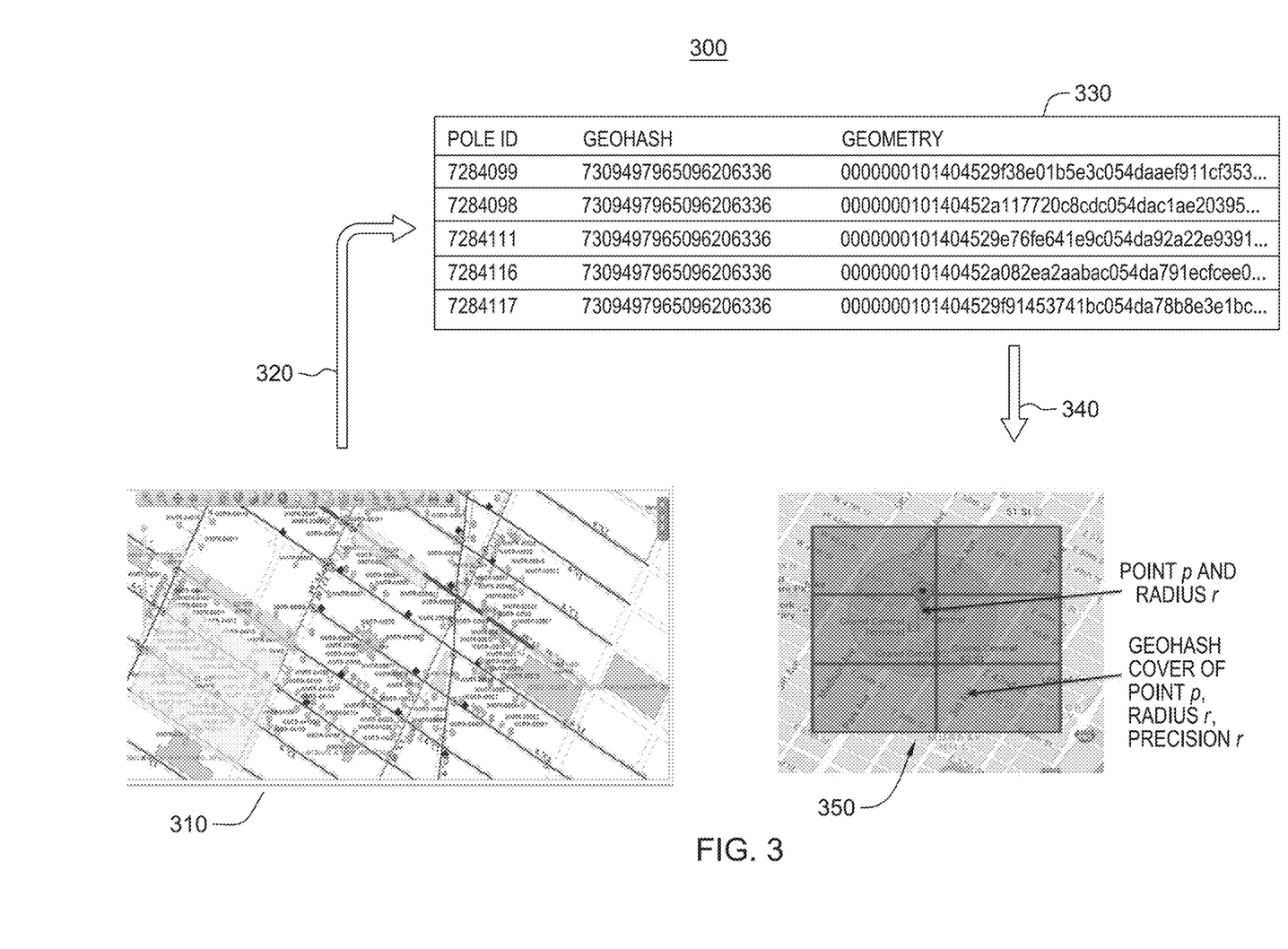
FIG. 3 is an indexing diagram illustrating a workflow for efficient spatial indexing, in accordance with an embodiment of the present invention.

FIG. 3 is an indexing diagram illustrating a workflow 300 for efficient spatial indexing, in accordance with an embodiment of the present invention.

In an embodiment, workflow 300 obtains asset data representing assets shown on a geographical map 310. The assets may be physical assets comprising spatial attributes and asset identifiers unique to each asset. In an embodiment, a location hash (e.g., geohash 350) may be generated 320 for each asset using the respective asset identifier and the respective spatial attribute. For example, table 330 may be an index table that includes POLE_ID as the asset identifier, GEOHASH as the location hash, and GEOMETRY as the spatial attribute.

In an embodiment, the asset may be a physical asset at a geographical location identifiable on a map 310. For example, the physical asset may be Grand Central bus terminal, wherein a location may be determined at the physical asset at a point p and radius r on the map 310. The one or more processors may be configured to generate 340 the location hash for the physical asset on the map 310. A geohash 350 may be generated 340 at the location hash for the physical asset to cover point p at radius r at a precision value. In FIG. 3, the geohash 350 is shown as a grid covering the location hash with six (6) congruent rectangular sections. The rectangular sections (e.g., boxes) together represent the geohash cover for a location at point p with a radius of distance r. Each "box" represents one geohash (e.g., location hash) having the chosen precision.

Figure 4:
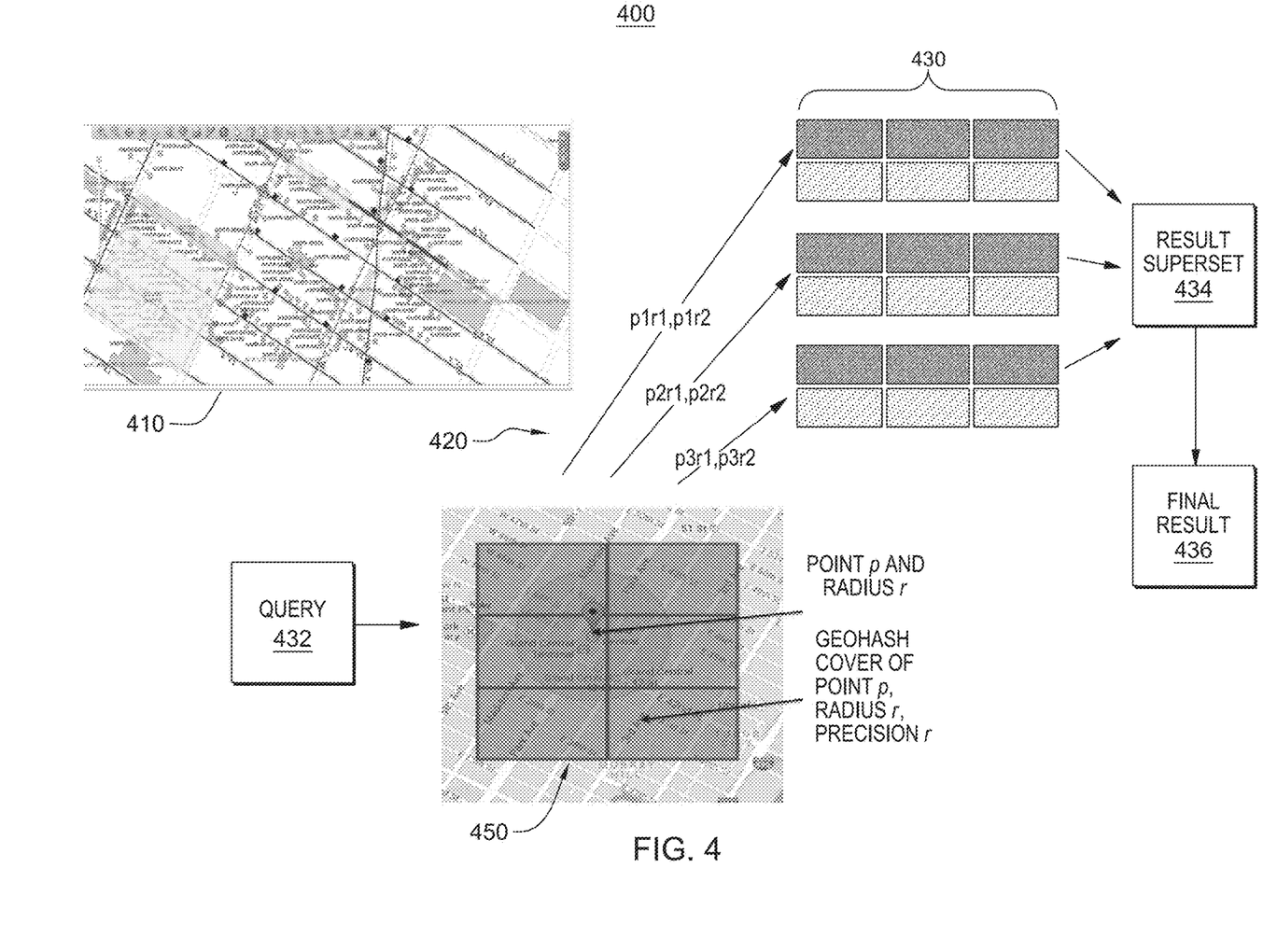
FIG. 4 is a querying diagram illustrating a workflow for efficient spatial indexing, in accordance with an embodiment of the present invention.

FIG. 4 is a querying diagram illustrating a workflow 400 for efficient spatial indexing, in accordance with an embodiment of the present invention;

In an embodiment, the one or more processors may be configured to receive a query 432 of the index data corresponding to assets represented in a geographical map 410, wherein the query 432 seeks to obtain all assets around a given search geometry G and search radius r. Further, the query 432 may be a spatial query that seeks to obtain all assets within a range containing spatial attributes such as a search radius r from a given point p. The one or more processors may be configured to determine one or more sets of location hashes based on the asset identifier (e.g., all assets within a search range of point p) and the spatial attribute (e.g., search radius r). The one or more processors may be configured to return a first set of results 420 stored in an index table 430 corresponding to the query 432 in a first query response time. For example, the first set of results 420 may include a first geohash (e.g., p1$r$1, p1$r$2), a second geohash (e.g., p2$r$1, p2$r$2), and a third geohash (e.g., p3$r$1, p3$r$2) stored in the index table 430, wherein the first set of results represent a result superset 434 (e.g., AssetId1, AssetId2, . . . , AssetIdN). The one or more processors may be configured to determine a precision index (e.g., p1, p2, . . . , pn), and for each available precision index, the one or more processors may be configured to obtain a search range and perform a range search database query on the respective index table.

Further, the one or more processors may be configured to obtain a final result 436 by performing an actual spatial operation on the final result superset. While the descriptions use the example of a distance query from a given location (which is a single point), several other spatial operations are supported. For example, one or more processors may be configured to perform a "Contains" spatial operation to check if a given spatial geometry contains other geometries. A spatial relation specifies how some object is located in space in relation to some reference object. When the reference object is much bigger than the object to locate, the latter is often represented by a point. The reference object is often represented by a bounding box. Also, the spatial attribute can include any supported geometry and is not limited to point geometries.

In an embodiment, the one or more processors may be configured to obtain a search range and perform a range search database query on the respective index table corresponding to the first set of results or the result superset. This embodiment describes an example that refers to other spatial operations as well, and not just distance operations. For example, the first superset of results may be obtained by querying each of the index tables (one for each precision) given a range on the location hash which are obtained from the generated geohash cover.

The one or more processors may be configured to generate the location hash for the physical asset on the map 410. A geohash 450 may be generated at the location hash for the physical asset to cover point p at radius r at a precision value. In FIG. 4, the geohash 450 is shown as a grid covering the location hash with six (6) congruent rectangular sections.

Figure 5:
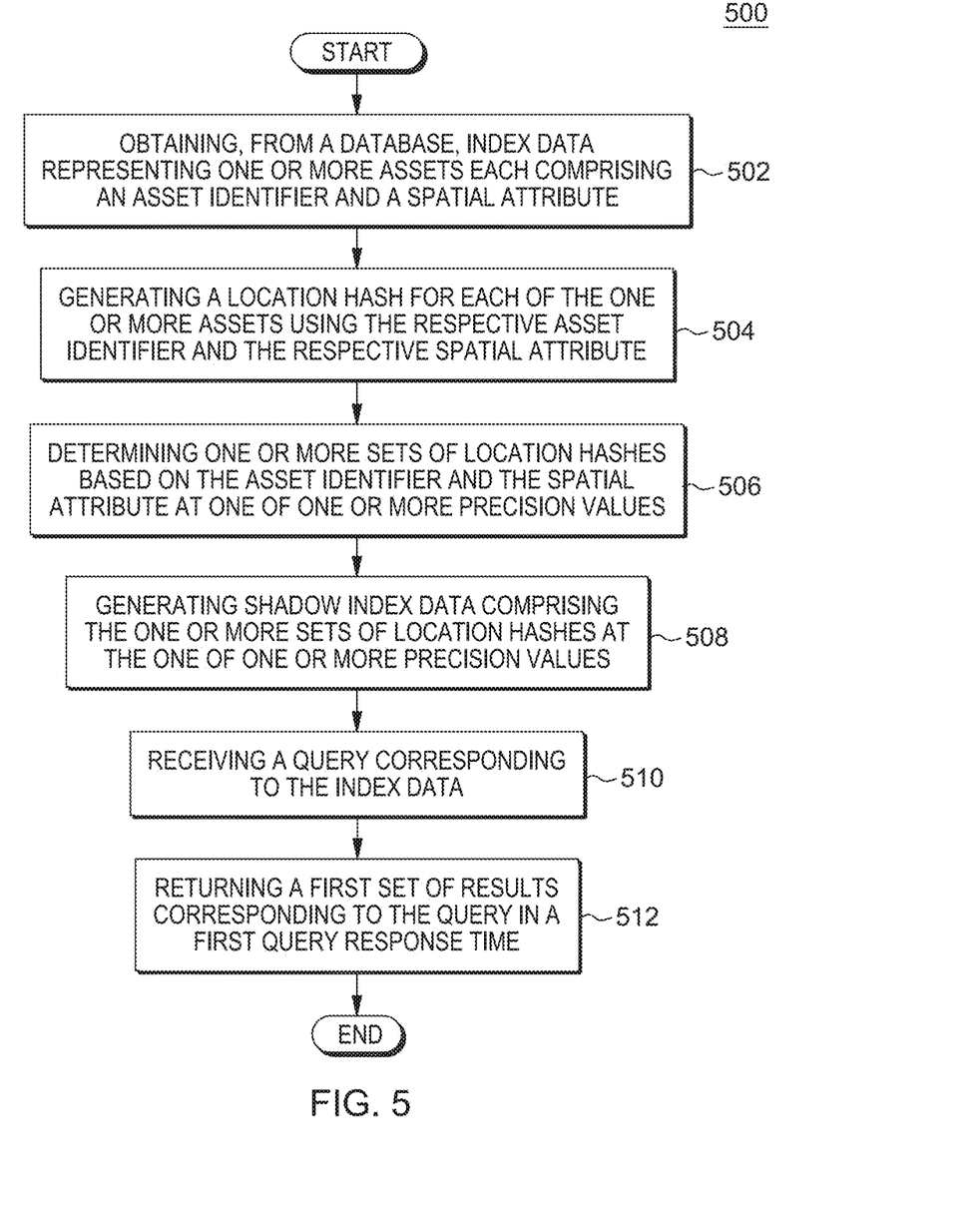
FIG. 5 is a flowchart depicting operational steps of a computer-implemented method, on a server computer within the distributed data processing environment of FIG. 1, for efficient spatial indexing, in accordance with an embodiment of the present invention.

FIG. 5 is a flowchart depicting operational steps of computer-implemented method 500, on a server computer within the distributed data processing environment of FIG. 1, for efficient spatial indexing, in accordance with an embodiment of the present invention.

In an embodiment, computer-implemented method 500 may include one or more processors configured for obtaining 502, from a database, index data representing one or more assets, wherein each of the one or more assets comprise an asset identifier and a spatial attribute. The index data may be representative of a library of assets stored in a database and organized in an index table based on certain attributes. Each asset may include an asset identifier to identify one particular asset and distinguish it from another asset. Each asset may also include a spatial attribute corresponding to its relative position within a geographical location.

Computer-implemented method 500 may include one or more processors configured for generating 504 a location hash for each of the one or more assets using the respective asset identifier and the respective spatial attribute. For example, generating 504 a location hash may include transforming a string of characters into a usually shorter fixed-length value or key that represents the original string. A location hash may be used to anchor a part of an asset address in a database. A location hash may be used to index and retrieve assets in a database because it is faster to find the assets using the shorter hashed key than to find it using the original value. Thus, in this embodiment, a location hash may be generated for each asset using at least the asset identifier and the spatial attribute. The asset identifier may be some combination of numeric, alphabetic, or alphanumeric characters. The location hash may be a geohash including a point value, a radius value, and one of the one or more precision values. In an embodiment, the spatial attribute may include a longitudinal value and a latitudinal value corresponding to a geographical location.

Computer-implemented method 500 may include one or more processors configured for determining 506 one or more sets of location hashes based on the asset identifier and the spatial attribute at one of one or more precision values. In an embodiment, the location hash may be a geohash including a point value, a radius value and one of the one or more precision values. In an embodiment, the spatial attribute may include a longitudinal value and a latitudinal value corresponding to a geographical location. For example, a precision value may correspond to a fraction of retrieved items that are relevant to the query (e.g., true positives divided by the true+false positives), using a pre-selected set of ground truths. In other words, precision is the fraction of retrieved assets that are relevant to the queried dataset as shown in equation (1).

$$\text{precision} = \frac{|\{\text{relevant assets}\} \cap \{\text{retrieved assets}\}|}{|\{\text{retrieved assets}\}|} \quad (1)$$

Therefore, a first set of location hashes may be determined based on assets defined by the asset identifiers and the spatial attributes at a first precision value. Further, a second set of location hashes may be determined based on assets defined by the asset identifiers and the spatial attributes at a second precision value that is different from the first precision value.

Computer-implemented method 500 may include one or more processors configured for generating 508 shadow index data comprising the one or more sets of location hashes at the one of one or more precision values. In an embodiment, the one or more processors configured for generating 508 the shadow index data may be further configured for creating a copy of the index data; and storing the copy of the index data in a shadow index table, wherein each of the sets of location hashes may be stored at their respective precision values.

Computer-implemented method 500 may include one or more processors configured for receiving 510 a query corresponding to the index data. In an embodiment, responsive to receiving 510 the query, the one or more processors may be configured for converting the query to a multi-step query by: scanning a first set of containments of the shadow index data based on a range of the location hash associated with the one or more assets; and performing a spatial operation on the first set of containments.

Computer-implemented method 500 may include one or more processors configured for returning 512 a first set of results corresponding to the query in a first query response time. In an embodiment, the one or more processors may be configured for returning a second set of results corresponding to the query in a second query response, wherein the first set of results may be based on the shadow index data and the second set of results may be based on the index data, and wherein the first query response time may be less than the second query response time by a predetermined threshold.

In an embodiment, the one or more processors configured for generating the shadow index data may be further configured for creating a copy of the index data. The one or more processors may be configured for storing the copy of the index data in a shadow index table, wherein each of the sets of location hashes may be stored at their respective precision values.

In an embodiment, the one or more processors may be configured for inserting the asset identifier and the spatial attribute for each asset into the respective sets of location hashes in the copy of the index data in the shadow index table.

Figure 6:
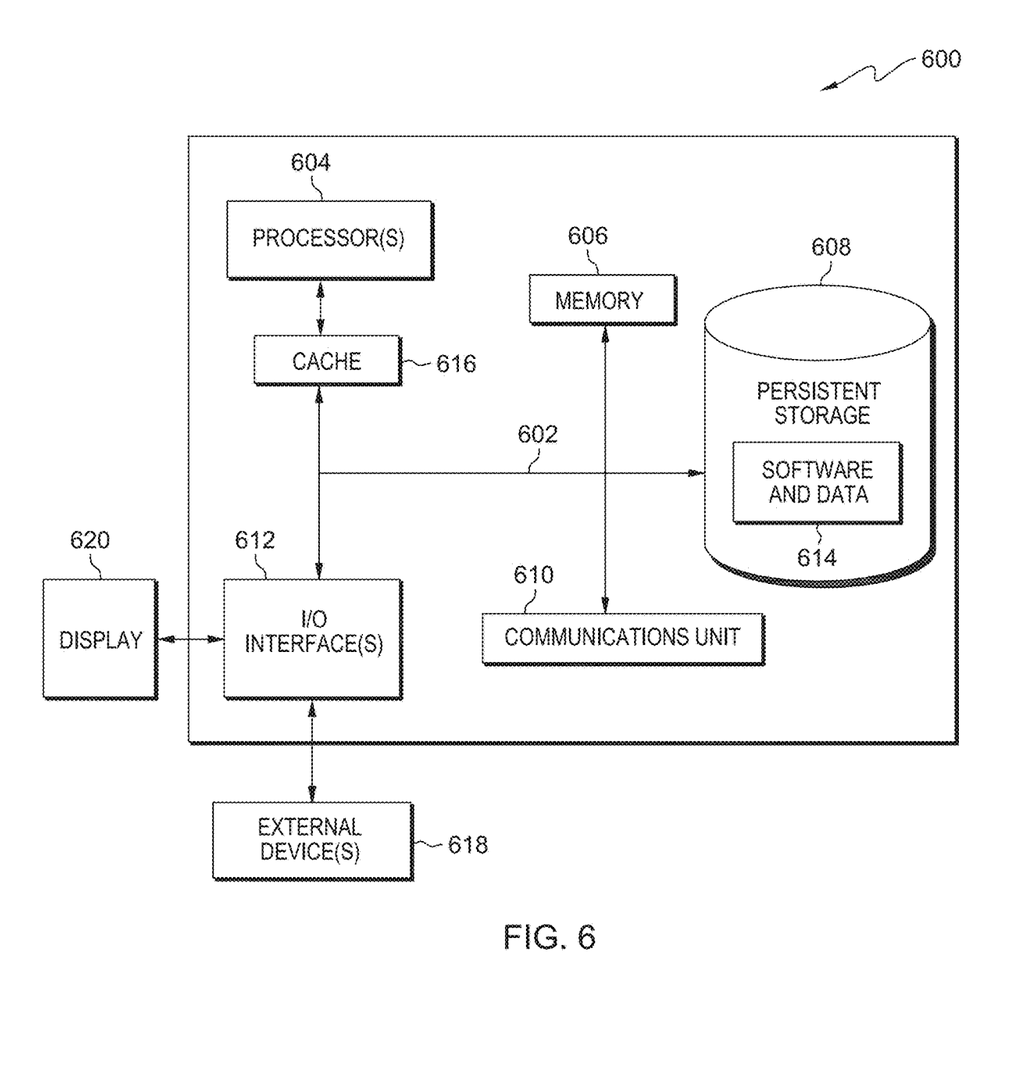
FIG. 6 depicts a block diagram of components of the server computer executing the computer-implemented method for efficient spatial indexing within the distributed data processing environment of FIG. 1, in accordance with an embodiment of the present invention.

FIG. 6 depicts a block diagram of components of computing device 600, in accordance with an embodiment of the present invention. FIG. 6 depicts a block diagram of computing device 600 suitable for server(s) 125, computing device 130 and user device 140, in accordance with an illustrative embodiment of the present invention. It should be appreciated that FIG. 6 provides only an illustration of one implementation and does not imply any limitations with regard to the environments in which different embodiments can be implemented. Many modifications to the depicted environment can be made.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs, as described herein, may be downloaded to persistent storage 608 through communications unit 610.

I/O interface(s) 612 allows for input and output of data with other devices that may be connected to computing device 120. For example, I/O interface 612 may provide a connection to external devices 618 such as a keyboard, a keypad, a touch screen, and/or some other suitable input device. External devices 618 can also include portable computer readable storage media such as, for example, thumb drives, portable optical or magnetic disks, and memory cards. Software and data 614 used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Software and data 614 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product.

The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for managing assets of an enterprise management system (EAM) capable of visualizing spatial relationships among the assets on a map, the computer-implemented method comprising:
    obtaining, by a processor, index data from a database, the index data representing a library of the assets stored in the database;
organizing, by the processor, the index data into an index table, wherein each of the assets within the index table has an asset identifier distinguishing each asset from another asset, a spatial attribute comprising a longitudinal value and a latitudinal value of each asset;
generating, by the processor, one-dimensional geohashes of the assets, with each of the one-dimensional geohashes comprising a string of characters generated using the asset identifier and spatial attribute of each of the assets, and a precision value selected from 1 to 12 for of each of the one-dimensional geohashes, the precision value selected from 1 to 12 is defined by a length of characters in each corresponding of the one-dimensional geohashes and as the length of characters increases, a size of the one-dimensional geohashes on the map decreases, and precision of the one-dimensional geohashes increase;
creating, by the processor, shadow indexes within the database, wherein each of the shadow indexes are configured to store sets of the one-dimensional geohashes at a corresponding precision value selected from 1 to 12;
storing, by the processor, the sets of the one-dimensional geohashes having a same precision value to corresponding shadow indexes configured to store the sets of the one-dimensional geohashes at the precision value of the one-dimensional geohashes within the set of geohashes;
receiving, by the processor, a query comprising a spatial operation seeking to obtain all of the assets represented in a geographical map, around given point (p) within a range-containing spatial attribute defined as a radius (r) from the given point (p);
converting, by the processor, the query into a multi-step query comprising a range-based scan step and a spatial operation step;
performing, by the processor, a range-based scan of the shadow indexes for assets with geohashes that cover the point (p) at the radius (r) at a chosen precision value from 1 to 12, wherein the assets within the range-based scan form a superset;
performing, by the processor, the spatial operation on the assets within the superset using the index data to output a final result indicating all assets within radius (r) of point (p); and
displaying, by the processor, the assets of the final result onto the geographical map.

2. The computer-implemented method of claim 1, wherein the sets of the one-dimensional geohashes includes a first set of geohashes determined based on the assets defined by the asset identifiers and the spatial attributes at a first precision value and a second set of geohashes determined based on the assets defined by the asset identifiers and the spatial attributes at a second precision value.

3. The computer-implemented method of claim 1, wherein first query response time for returning results of the superset from the shadow indexes is less than a second query response time for returning the final result from the index table.

4. The computer-implemented method of claim 1, further comprising:
    mapping, by the processor, a geohash cover onto the geographical map for a location at point (p) with a radius (r), the geohash cover covering the location as a grid of congruent rectangle sections and each of the rectangle sections represents one geohash of the assets.

5. The computer-implemented method of claim 1, wherein the spatial operation of the query further comprises a spatial relation specifying how assets are located in space in relation to a reference object, where in the reference object is represented by a bounding box.

6. A computer program product for
    one or more non-transitory computer readable storage media and program instructions collectively stored on the one or more non-transitory computer readable storage media, the stored program instructions comprising instructions to:
    obtain index data from a database, the index data representing a library of the assets stored in the database;
organize the index data into an index table, wherein each of the assets within the index table has an asset identifier distinguishing each asset from another asset, a spatial attribute comprising a longitudinal value and a latitudinal value of each asset;
generate one-dimensional geohashes of the assets, with each of the one-dimensional geohashes comprising a string of characters generated using the asset identifier and spatial attribute of each of the assets, and a precision value selected from 1 to 12 for of each of the one-dimensional geohashes, the precision value selected from 1 to 12 is defined by a length of characters in each corresponding of the one-dimensional geohashes and as the length of characters increases, a size of the one-dimensional geohashes on the map decreases, and precision of the one-dimensional geohashes increase;
create shadow indexes within the database, wherein each of the shadow indexes are configured to store sets of the one-dimensional geohashes at a corresponding precision value selected from 1 to 12;
store the sets of the one-dimensional geohashes having a same precision value to corresponding shadow indexes configured to store the sets of the one-dimensional geohashes at the precision value of the one-dimensional geohashes within the set of geohashes;
receive a query comprising a spatial operation seeking to obtain all of the assets represented in a geographical map, around given point (p) within a range-containing spatial attribute defined as a radius (r) from the given point (p);
convert the query into a multi-step query comprising a range-based scan step and a spatial operation step;
perform a range-based scan of the shadow indexes for assets with geohashes that cover the point (p) at the radius (r) at a chosen precision value selected from 1 to 12, wherein the assets within the range-based scan form a superset;
perform the spatial operation on the assets within the superset using the index data to output a final result indicating all assets within radius (r) of point (p); and
display the assets of the final result onto the geographical map.

7. The computer program product of claim 6, wherein the sets of the one-dimensional geohashes includes a first set of geohashes determined based on the assets defined by the asset identifiers and the spatial attributes at a first precision value and a second set of geohashes determined based on the assets defined by the asset identifiers and the spatial attributes at a second precision value.

8. The computer program product of claim 6, wherein first query response time for returning results of the superset from the shadow indexes is less than a second query response time for returning the final result from the index table.

9. The computer program product of claim 6, further comprising:
mapping, by the processor, a geohash cover onto the geographical map for a location at point (p) with a radius (r), the geohash cover covering the location as a grid of congruent rectangle sections and each of the rectangle sections represents one geohash of the assets.

10. The computer program product of claim 6, wherein the spatial operation of the query further comprises a spatial relation specifying how assets are located in space in relation to a reference object, where in the reference object is represented by a bounding box.

11. A computer system for managing assets of an enterprise management system (EAM) capable of visualizing spatial relationships among the assets on a map, the computer-implemented method comprising:
one or more computer processors;
one or more computer non-transitory readable storage media;
program instructions collectively stored on the one or more non-transitory computer readable storage media for execution by at least one of the one or more computer processors, the stored program instructions comprising instructions to:
obtain index data from a database, the index data representing a library of the assets stored in the database;
organize the index data into an index table, wherein each of the assets within the index table has an asset identifier distinguishing each asset from another asset, a spatial attribute comprising a longitudinal value and a latitudinal value of each asset;
generate one-dimensional geohashes of the assets, with each of the one-dimensional geohashes comprising a string of characters generated using the asset identifier and spatial attribute of each of the assets, and a precision value selected from 1 to 12 for of each of the one-dimensional geohashes, the precision value selected from 1 to 12 is defined by a length of characters in each corresponding of the one-dimensional geohashes and as the length of characters increases, a size of the one-dimensional geohashes on the map decreases, and precision of the one-dimensional geohashes increase
create shadow indexes within the database, wherein each of the shadow indexes are configured to store sets of the one-dimensional geohashes at a corresponding precision value selected from 1 to 12;
store the sets of the one-dimensional geohashes having a same precision value to corresponding shadow indexes configured to store the sets of the one-dimensional geohashes at the precision value of the one-dimensional geohashes within the set of geohashes;
receive a query comprising a spatial operation seeking to obtain all of the assets represented in a geographical map, around given point (p) within a range-containing spatial attribute defined as a radius (r) from the given point (p);
convert the query into a multi-step query comprising a range-based scan step and a spatial operation step;
perform a range-based scan of the shadow indexes for assets with geohashes that cover the point (p) at the radius (r) at a chosen precision value selected from 1 to 12, wherein the assets within the range-based scan form a superset;
perform the spatial operation on the assets within the superset using the index data to output a final result indicating all assets within radius (r) of point (p); and
display the assets of the final result onto the geographical map.

12. The computer system of claim 11, wherein the sets of the one-dimensional geohashes includes a first set of geohashes determined based on the assets defined by the asset identifiers and the spatial attributes at a first precision value and a second set of geohashes determined based on the assets defined by the asset identifiers and the spatial attributes at a second precision value.

13. The computer system of claim 11, wherein first query response time for returning results of the superset from the shadow indexes is less than a second query response time for returning the final result from the index table.

14. The computer system of claim 11, further comprising:
mapping, by the processor, a geohash cover onto the geographical map for a location at point (p) with a radius (r), the geohash cover covering the location as a grid of congruent rectangle sections and each of the rectangle sections represents one geohash of the assets.

15. The computer system of claim 11, wherein the spatial operation of the query further comprises a spatial relation specifying how assets are located in space in relation to a reference object, where in the reference object is represented by a bounding box.

* * * * *